UNITED STATES PATENT OFFICE.

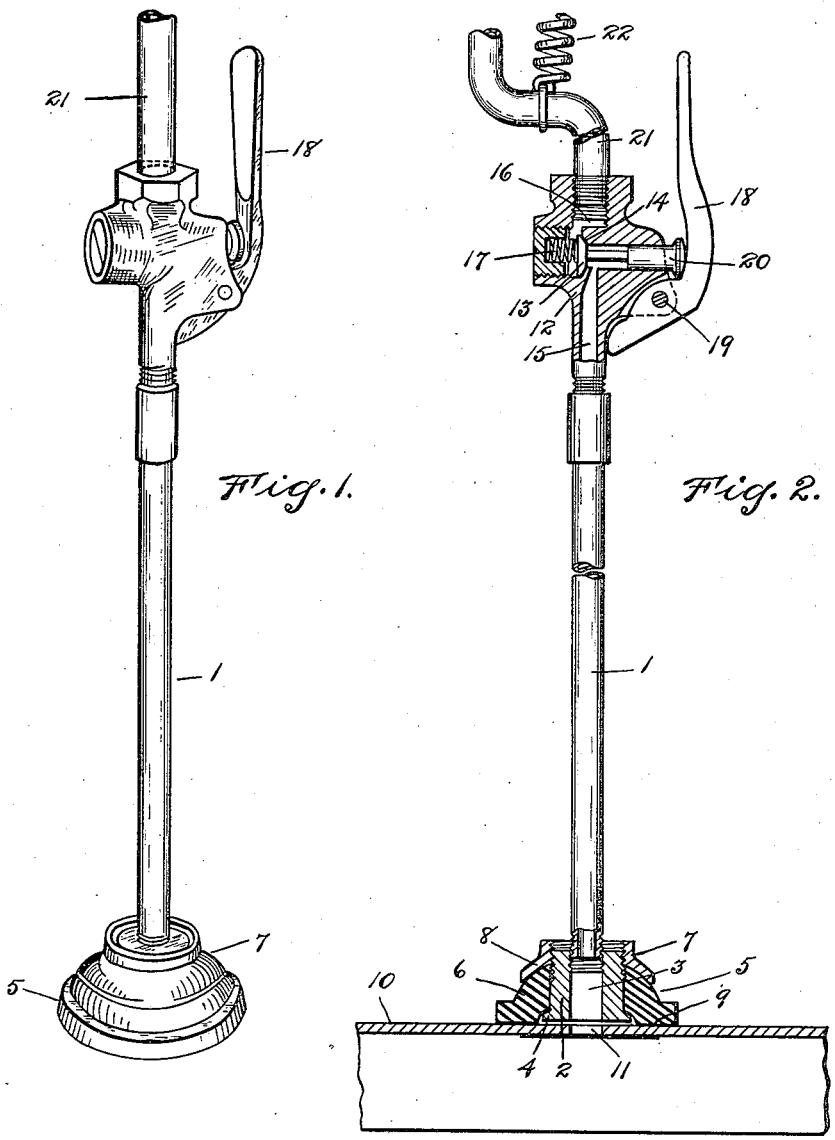

JOHN PRISKEY, OF DETROIT, MICHIGAN.

ICE-CREAM REMOVER.

1,425,337.  Specification of Letters Patent.  Patented Aug. 8, 1922.

Application filed October 10, 1919. Serial No. 329,875.

*To all whom it may concern:*

Be it known that I, JOHN PRISKEY, a citizen of the United States of America, residing at Detroit, in the county of Wayne and State of Michigan, have invented certain new and useful Improvements in Ice-Cream Removers, of which the following is a specification, reference being had therein to the accompanying drawings.

The invention relates to ice cream removers, and is designed particularly for removing ice cream bricks from the receptacles in which they are molded. The main object of the invention is to provide a simple construction for applying air under pressure between the molded article and its receptacle to remove the molded article from the receptacle. Another object is the provision of a device which can be readily applied and when applied can be controlled to permit of the passage of compressed air. Other objects of the invention reside in the novel combinations and arrangements of parts as more fully hereinafter set forth.

In the drawings:

Figure 1 is a perspective view of the construction embodying my invention;

Figure 2 is a longitudinal cross section therethrough;

In creameries it has been the usual practice heretofore to remove brick ice cream from the receptacles in which it is molded by first dipping the receptacles into hot water and then inverting the receptacles and pounding the sides and bottom thereof to loosen the ice cream therein. Each of these receptacles is made with an aperture in its bottom, over which is placed suitably prepared paper, such as paraffin paper. The purpose of this aperture is to permit of the entrance of atmospheric air between the brick and the receptacle, while the former is being removed from the latter. This method is objectionable due to the fact that the receptacles are damaged and also due to the fact that it requires considerable time to remove an ice cream brick.

My device comprises the tube 1 having the member 2 threadedly engaging its lower end and provided with a passageway 3 in alignment with that in the tube. This member has the annular flange 4 at its lower end, against which is clamped the sealing member 5, the main body portion 6 of which surrounds the member 2 and is clamped against the flange 4 by means of the clamping member 7 for yieldably suspending said tube, and of the member 2 and provided with the annular flange 8 engaging the main body portion 6 of the sealing member. This sealing member has its lower end 9 forming an annular plane surface and located below the end of the member 2, so that when the device is applied to a receptacle, such as the pan 10 having the aperture 11 in its bottom, the plane surface 9 of the sealing member engages the bottom of the pan around the aperture 11 and seals the joint between the tube and the pan.

12 is a valve casing secured to the upper end of the tube 1 and provided with the valve 13 adapted to engage a seat 14 to separate the passageways 15 and 16 in the valve casing, the passageway 15 being in alignment with that in the tube 1. 17 is a spring for yieldably maintaining the valve 13 in engagement with its seat. 18 is a handle pivotally mounted at 19 upon the valve casing and adapted to engage the stem 20 of the valve to disengage the valve from its seat. 21 is a suitable conduit adapted for the passage of air under pressure and connected to the valve casing and communicating with the passageway 16. 22 is a coil spring connected to the conduit 21 and adapted to yieldably maintain the latter with the removing device in raised position.

To remove an ice cream brick from a pan the latter is first dipped into hot water and then inverted and raised a slight distance from the surface of the table, preferably by raising one end thereof. The operator then applies the device by lowering the same, so that the sealing member 5 has its sealing surface 8 contacting with the bottom of the pan 10 and surrounding the aperture 11 therein. The valve 13 is then opened by swinging the pivoted lever 18, thereby allowing air under pressure to enter the passageways 16 and 15, the passageway in the tube 1 and the passageway 3. This air passes through the aperture 11 in the pan and enters between the brick and receptacle and readily forces the former from the latter.

An important feature of my invention resides in the fact that the arrangement is such that the operator can apply my device and control the passage of air under pressure therethrough with but one hand.

What I claim as my invention is:

1. In a device for blowing molded articles from molds having apertures in their bottoms, the combination with a valve controlled member freely movable laterally and vertically to different positions in a horizontal plane into registration with an aperture in a mold and adapted to conduct air under pressure, of means for sealing the space between said valve controlled member and the bottom of said mold around said aperture.

2. In a device for blowing molded articles from molds having apertures in their bottoms, the combination with a tube adapted for the passage of air under pressure and movable laterally and vertically into registration with an aperture in a mold, of a sealing member at one end of said tube and surrounding the same, said sealing member extending beyond the end of said tube and adapted to engage the bottom of said mold around said aperture, a conduit connected to said tube and adapted for the passage of air under pressure to said tube, means for yieldably suspending said tube, and means for governing the passage of the air through said tube, said means constituting a hand grip for lowering said tube to engage said sealing member with the bottom of a mold and around its aperture.

3. In a device for blowing molding articles from molds, the combination with a tube for the passage of air under pressure, of a tubular member threadedly engaging one end of said tube and having a passageway registering with said tube and an annular flange at its outer end, and a yieldable sealing member surrounding said tubular member and provided with a portion projecting outwardly beyond said annular flange, and a flange member threadedly engaging the inner end of said tubular member and clamping said sealing member against said annular flange.

In testimony whereof I affix my signature.

JOHN PRISKEY.